R. ABELL.
ODOMETER.
APPLICATION FILED APR. 16, 1910.
1,265,023.
Patented May 7, 1918.
2 SHEETS—SHEET 1.
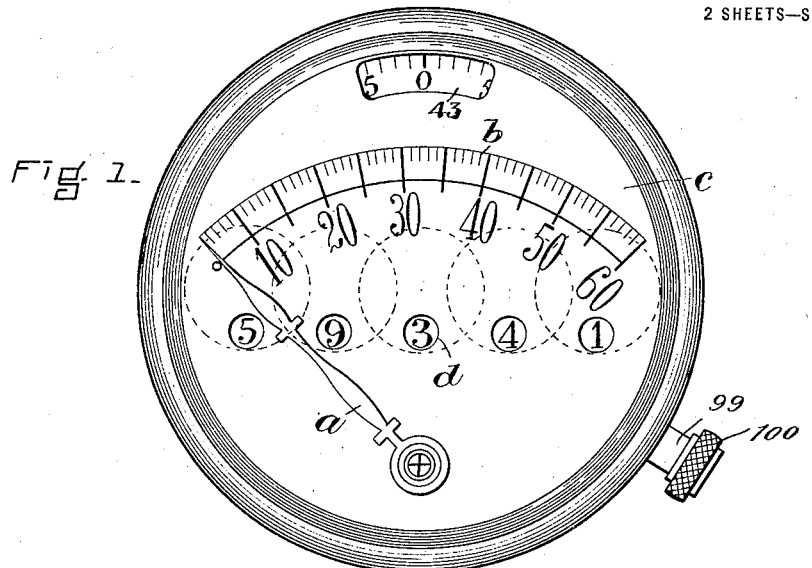
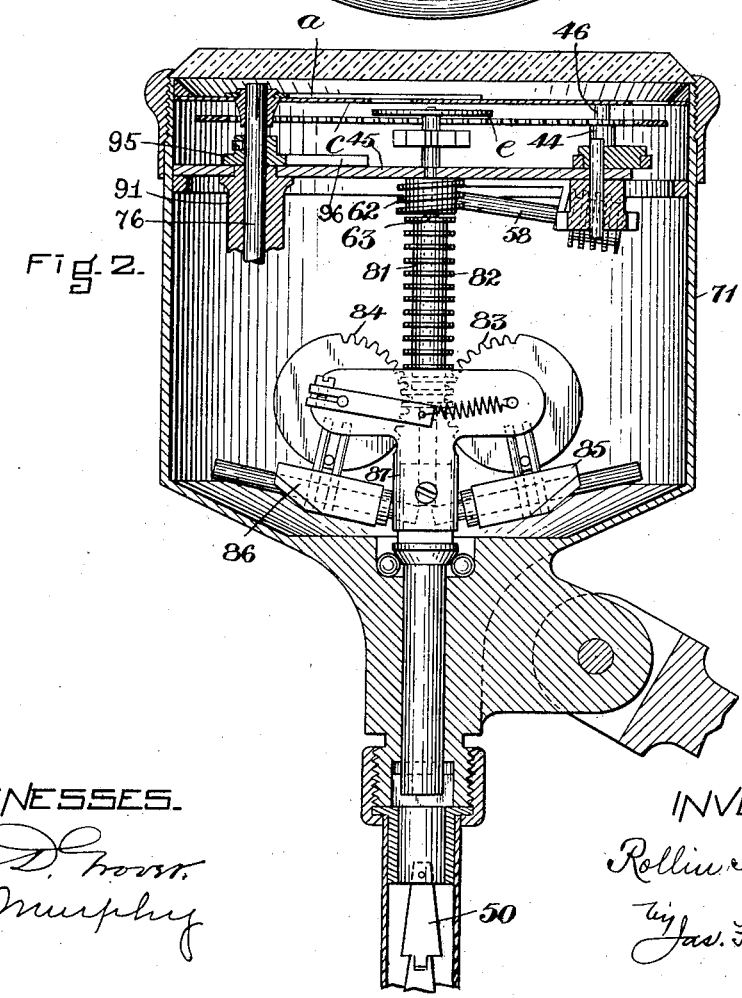
WITNESSES.
INVENTOR.
Rollin Abell
by Jas. H. Churchill
atty.

R. ABELL.
ODOMETER.
APPLICATION FILED APR. 16, 1910.

1,265,023.

Patented May 7, 1918.
2 SHEETS—SHEET 2.

WITNESSES.

INVENTOR.
Rollin Abell
by Jas. H. Churchill
Atty.

UNITED STATES PATENT OFFICE.

ROLLIN ABELL, OF BOSTON, MASSACHUSETTS.

ODOMETER.

1,265,023.

Specification of Letters Patent.

Patented May 7, 1918.

Application filed April 16, 1910. Serial No. 555,957.

*To all whom it may concern:*

Be it known that I, ROLLIN ABELL, a citizen of the United States, residing in Boston, county of Suffolk, and State of Massachusetts, have invented an Improvement in Odometers, of which the following description, in connection with the accompanying drawings, is a specification, like letters on the drawings representing like parts.

This invention relates to an odometer especially designed and adapted among other uses to be employed on automobiles and like vehicles.

The invention has for its object to provide a compact instrument having a minimum number of parts, and in which the trip mileage and the total mileage can be determined, by mechanism driven from the same actuator and yet otherwise independent so that the trip mileage mechanism may be reset without affecting the totalizer.

The invention further has for its object to provide a simple, efficient and accurate instrument of the class described.

These and other features of this invention will be pointed out in the claims at the end of this specification.

Figure 1 is a plan view of an instrument embodying this invention.

Fig. 2, a vertical section of the instrument shown in Fig. 1.

Figure 3:
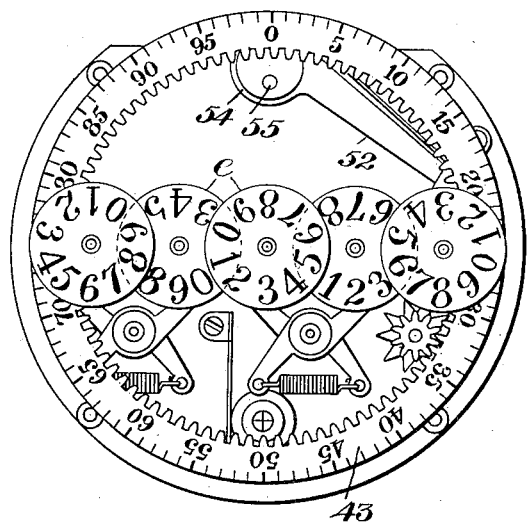

Fig. 3, a plan of the instrument shown in Fig. 1, with the pointer and dial removed.

Figure 4:
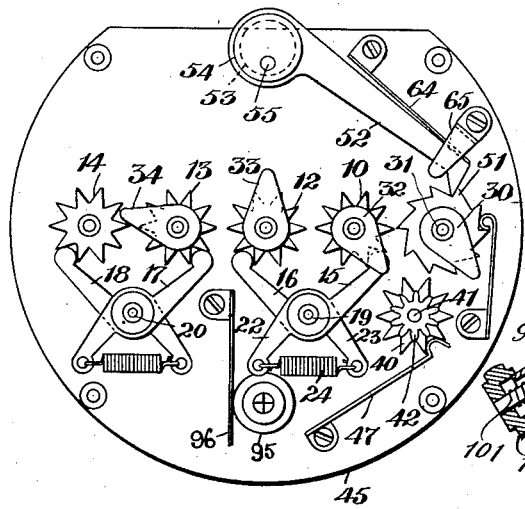
Figure 5:
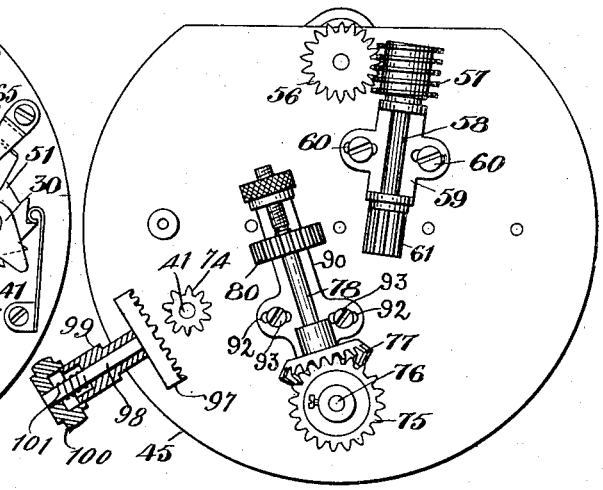

Fig. 4, a detail in plan of the mechanism for operating the totalizer disks and the trip ring, and Fig. 5, an inverted view of the plate shown in Fig. 3, showing the driving mechanism for the totalizer and the trip ring.

The present invention is shown as embodied in a combined speedometer and odometer, although the invention relates more particularly to the odometer portion of the instrument.

The speedometer portion of the instrument herein shown, comprises a pointer $a$, which responds to the speed of the vehicle and coöperates with the scale $b$ on a dial $c$ in the manner well understood.

The dial $c$ is provided with a plurality of substantially small openings $d$, through which are displayed the numbers on a plurality of disks $e$ located below the dial and forming part of the totalizer.

In the present instance, five disks $e$ are shown, which have coöperating with four of them gears or toothed wheels and dogs, so that the complete revolution of one disk $e$ effects movement of the next adjacent disk the distance of one tooth of the gear or wheel connected with said adjacent disk, in a manner well understood. The gears or wheels are preferably provided with star teeth, one for each number on the disk, and have coöperating with them detent levers arranged in pairs. As represented in Fig. 4, the four wheels are numbered 10, 12, 13, 14, and have coöperating with them four levers 15, 16, 17, 18, which are arranged in pairs, the levers 15, 16, being mounted on a common pivot 19, and the levers 17, 18, being mounted on a common pivot 20. The construction and arrangement of both pairs of levers are the same, and a detailed description of one pair will suffice.

The levers 15, 16 cross each other and have their rear arms 22, 23 connected together by a coil spring 24. The spring 24 tends to draw the rear arms together and thereby move the front arms of the levers toward each other and into engagement with the teeth of the wheels 10, 12, said front arms having nubs or projections which are of proper size and shape to engage two adjacent teeth of the wheels 10, 12, and firmly hold them stationary until positively moved.

The levers 15, 16 are capable of independent movement, and when one lever as 15 is turned on its pivot by the rotary movement of the wheel 10, the other lever 16 is stationary and serves as an anchor for the spring 24, and when the lever 16 is turned by its wheel 12, the lever 15 is stationary and serves as an anchor for the said spring. Any other suitable detent construction may be employed.

The wheel 10, which carries the units disk $e$, is rotated step by step by the dog 30 fast on the shaft 31 carrying the tens disk $e$. The wheels 12, 13 and 14, the corresponding disks of which indicate tens, hundreds and thousands of miles respectively, are rotated step by step by similar dogs 32, 33, 34. The dog 30 also coöperates with a star wheel 40 and rotates the same step by step, said wheel being arranged with relation to the wheel 10, so that the dog 30 at each rotation of its shaft 31 engages a tooth of the wheel 40 and then engages a tooth of the wheel 10. The star wheel 40 has fast on its shaft 41 a pinion 42, having the same number of teeth as the wheel 40, and constituting the driving pinion for an internally toothed ring 43, having numbers and graduations indicative of units of distance, such as miles, said ring constituting the trip ring of the instrument. The trip ring 43 is bodily movable in a circular path and is supported as herein shown upon posts 44 erected upon the disk or plate 45, which forms a supporting frame for the totalizer and other parts of the instrument, the said trip ring being guided in its movement by reduced end portions 46 of said posts, against which the outer circumference of the ring bears. The trip ring 43 is held from accidental movement by a spring pawl or detent 47, which coöperates with the star wheel 40. It will thus be seen that the trip ring 43 and the totalizer are actuated by the same driving or operating mechanism, namely, the dog 30 and shaft 31, which latter is rotated step by step from the continuously driven flexible shaft 50 commonly used with an instrument of this class for connecting it with the front wheel of the vehicle.

In the present instance, the shaft 31 has fast on it a ratchet wheel 51 provided with ten teeth with which coöperates a push pawl 52 mounted on the hub 53 of a disk 54 (see Fig. 4), eccentrically mounted on a shaft 55 having bearings in the plate 45 and provided below the same with a gear 56, which meshes with a worm 57 on a shaft 58 supported by a bar 59 attached to the plate 45 by screws 60. The shaft 58 is provided with a gear 61, which meshes with and is driven by a worm 62 on a shaft 63, which is connected with the flexible shaft 50 to be rotated thereby. The push pawl 52 is yieldingly held in engagement with the ratchet wheel 51 by a spring 64 and is guided by a bracket 65 (see Fig. 4).

Under normal conditions, the dog 30 on the shaft 31 is in engagement with the star wheel 40, and on each revolution of the shaft 31, the said dog turns the star wheel 40 the distance of one tooth, thereby through the pinion 42 and gear teeth on the trip ring, moving the latter the distance of one tooth. After the dog 30 has acted on the star wheel 40, it engages the star wheel 10 and moves the latter the distance of one tooth on each revolution of the shaft 31.

The rotation of the shaft 41 in order to reset the trip ring 43 may be effected from outside the casing 71 by means of a suitable shaft 98 which is geared to a pinion 74 on the shaft 41. The latter is capable of being rotated in either direction, except when the dog 30 meshes with the teeth of the star wheel 10, and at this time the trip ring can be rotated in one direction. Resetting shaft 98 is mounted in a bearing member 99 and is movable endwise. A crown gear 97 is carried by the inner end of the resetting shaft and is arranged to coact with gear 74 when the resetting shaft is pushed in. An operating head or button 100 is affixed to the outer end of the resetting shaft, and a helical compression spring 101 acts against said head to retract gear 97 from gear 74.

The pointer a may be operated to respond to the speed of the vehicle by suitable gearing and preferably by a bevel gear 75 on the pointer shaft 76 (see Fig. 5), a bevel gear 77 on a shaft 78 supported from the underside of the frame plate 45, the shaft 78 having a pinion 80, which is rotated by mechanism operatively connected with the flexible shaft 50 and comprising essentially a sleeve 81 on the shaft 63 and provided with circular teeth 82, which are engaged by gears 83, 84, which are rotated by centrifugally operated weighted arms 85, 86, carried by a sleeve 87 fast on the shaft 63 after the manner described in United States Patent No. 927,828 granted July 13, 1909.

From the above description, it will be seen that the numbered disks of the totalizer are firmly held against accidental movement, and that both the trip ring and totalizer are actuated by a single mechanism or device.

The shaft 78 is journaled in a bracket 90 having a hub or sleeve 91 mounted on the pointer shaft 76, so that the pinion 80 may be adjusted toward and from its coöperating driving mechanism (not shown), said bracket having elongated slots 92 through which are extended set screws 93 by means of which the bracket may be fastened in its adjusted position.

Provision is made for steadying the pointer a, and for this purpose, the pointer shaft 76 has fast on it a collar 95 against which bears a spring 96.

From the foregoing description, it will be apparent that the trip mileage is shown on the same dial that exhibits the total mileage. That is, I am able to employ a single relatively small dial having an aperture through which the numerals on the trip ring are successively visible, and a row of apertures through which the numerals on the disks of the totalizing mechanism are visible. At the end of the trip, the trip ring may be reset by turning it either forwardly or backwardly without affecting the totalizing mechanism.

Claims:

1. An instrument of the character described, comprising in combination, a total register, a rotatable trip-ring encircling said total register and having indicating numerals, means arranged to drive said total register and said trip-ring, said trip-ring being rotatable in either direction from one indicating position to another, independently of said total register.

2. An instrument of the character described, comprising in combination, a dial, a total register arranged behind said dial and having indicating numerals, means arranged to drive said total register, a rotatable trip-ring arranged to encircle said total register, said trip-ring having indicating numerals and gear-teeth, and gearing arranged to transmit registering movement from said total register to said trip-ring, said trip-ring being rotatable independently of registering movement of said total register, from any indicating position to any other indicating position, said dial having sight openings arranged to show the effective numerals of said total register and said trip-ring respectively.

3. An instrument of the character described, comprising in combination, a total register and means arranged to drive the same, a rotatable trip-ring arranged to encircle said total register, said trip-ring having indicating numerals and gear-teeth, and intermittent gearing arranged to transmit registering movement positively from said total register to said trip-ring, said gearing being arranged to permit rotative movement of said trip-ring in either direction without causing registering movement of said total register.

4. An instrument of the character described, comprising in combination, a rotatable trip-ring having indicating numerals and gear-teeth, a pinion arranged in meshed relation with the teeth of said trip-ring, an independent rotatable registering member arranged within said trip-ring, means arranged to impart registering movement to said registering member, means arranged to transmit registering movement positively and intermittently from said registering member to said trip-ring by way of said pinion, and manually operative means including a gear arranged to coact with said pinion, said manually operative means being arranged to turn said ring in either direction, and said trip-ring being rotatable in either direction without causing registering movement of said registering member.

In testimony whereof I have signed my name to this specification in the presence of two subscribing witnesses.

ROLLIN ABELL.

Witnesses:
JAS. H. CHURCHILL,
J. MURPHY.